(12) United States Patent
Yamashita et al.

(10) Patent No.: US 6,392,972 B1
(45) Date of Patent: May 21, 2002

(54) OPTICAL STORAGE UNIT HAVING A DUAL POSITION OPTICAL PHASE ADJUSTER

(75) Inventors: Satoshi Yamashita; Yasuaki Morimoto; Motohiro Ito, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/328,712

(22) Filed: Jun. 9, 1999

(30) Foreign Application Priority Data

Dec. 1, 1998 (JP) .......................................... 10-341937

(51) Int. Cl.[7] .............................................. G11B 7/00
(52) U.S. Cl. ................. 369/53.33; 369/13.55; 369/44.24; 369/112.02
(58) Field of Search ...................... 369/44.26, 44.23, 369/13, 116, 53.36, 53.33, 47.52, 47.53, 44.28, 112.02, 112.17, 44.24, 13.55, 59.2, 124.14; 385/6, 14, 8, 3

(56) References Cited

U.S. PATENT DOCUMENTS

| | | | | |
|---|---|---|---|---|
| 5,530,641 A | * | 6/1996 | Kanehira | ................. 469/44.26 |
| 5,625,725 A | * | 4/1997 | Nakano et al. | ................ 385/14 |
| 5,784,347 A | * | 7/1998 | Miyamoto et al. | ........ 369/53.33 |
| 5,831,942 A | * | 11/1998 | Morimoto et al. | ............ 369/13 |
| 5,936,924 A | * | 8/1999 | Tanaka | ..................... 369/47.52 |
| 6,055,218 A | * | 4/2000 | Takeda et al. | ............ 369/44.28 |
| 6,167,006 A | * | 12/2000 | Tanaka et al. | ............ 369/44.26 |

FOREIGN PATENT DOCUMENTS

| | | |
|---|---|---|
| JP | 8007357 | 1/1996 |
| JP | 9128825 | 5/1997 |
| JP | 9161347 | 6/1997 |
| JP | 9282732 | 10/1997 |
| JP | 9320066 | 12/1997 |

* cited by examiner

*Primary Examiner*—David Hudspeth
*Assistant Examiner*—Kim-Kwok Chu
(74) *Attorney, Agent, or Firm*—Greer, Burns & Crain, Ltd.

(57) ABSTRACT

An optical storage unit which uses a light beam to record information on and/or reproduce information from a recording medium. The recording medium is provided with at least one land and at least one groove, and information is recorded in plural sectors in each of the land(s) and groove(s). The optical storage unit includes an optical phase adjuster for adjusting a phase of a polarization component of the light beam reflected from the recording medium based on a track type determination of a target address. An optical pickup is provided for reproducing information recorded on the recording medium using the phase-adjusted polarization component of the light beam.

13 Claims, 8 Drawing Sheets

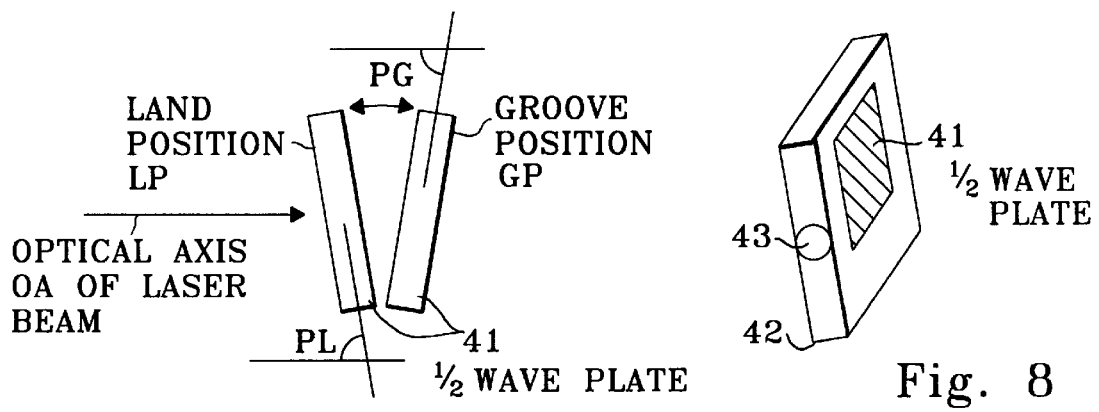
Fig. 7
Fig. 8
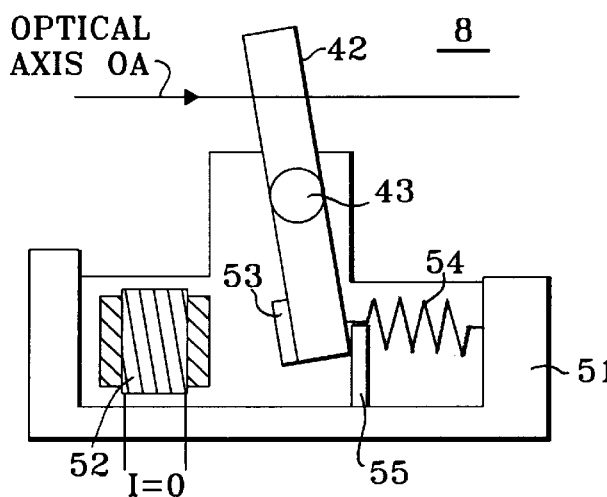
Fig. 9A
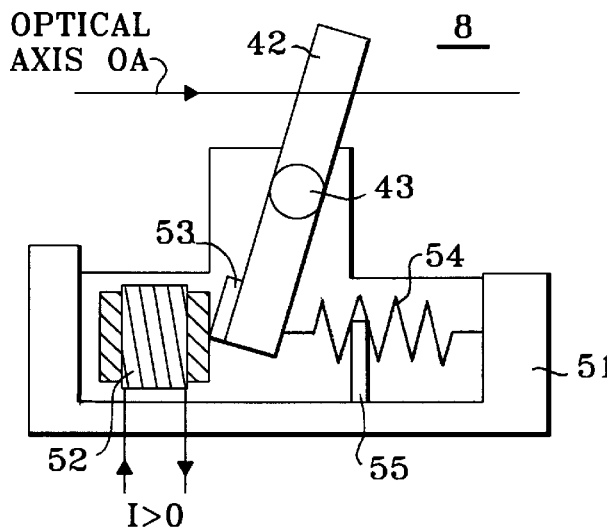
Fig. 9B

OPTICAL STORAGE UNIT HAVING A DUAL POSITION OPTICAL PHASE ADJUSTER

FIELD OF THE INVENTION

The present invention generally relates to optical storage units, and particularly relates to a storage unit which can automatically and accurately adjust an optical phase compensation quantity at a high speed in a relatively simple manner, so that information can satisfactorily be reproduced from the recording medium while crosstalk from an adjacent track of a recording medium is reduced.

BACKGROUND OF THE INVENTION

Presently, optical recording mediums are popularly used as recording mediums capable of recording and reproducing audio signals and image signals thereon and therefrom. Particularly, research and development efforts are currently being made with respect to magneto-optical recording mediums and phase change recording mediums which are promising rewritable high-density recording mediums.

In order to improve the recording density of the optical recording medium which records information on a spiral track or concentric tracks, there are two conceivable techniques, namely, reducing the track pitch and improving the linear recording density. Both of these techniques can be realized by reducing the wavelength of a laser beam emitted from a semiconductor laser which is used for the recording and reproduction. However, an inexpensive semiconductor laser which can emit a stable green or a blue laser beam at room temperature for a prolonged period of time has yet to be developed. Under these circumstances, there are proposals to greatly improve the recording density using a conventional laser beam such as a magnetic super resolution (MSR) laser proposed for the magneto-optical recording medium.

In the case of a rewritable memory medium such as the magneto-optical recording medium, the light beam used for information recording and the light beam used for reproduction have the same wavelength.

On the other hand, in the case of a read only memory (ROM) medium information in the form of phase pits is prerecorded on the recording medium using a special gas laser or the like having a shorter wavelength than that used to record information in a rewritable memory medium.

The ROM medium possesses a higher recording ratio than a comparable rewritable medium because information is recorded using a shorter wavelength. However, the high cost of the necessary laser makes it uneconomical to utilize this type of gas laser in a rewritable drive.

Another approach to increasing the storage capacity of a disk medium is to increase the number of tracks by, for example, providing tracks in both land and groove portions of the medium (land-groove type recording medium). Typically, tracks are provided on either a land or a groove portion of a recording medium. In contrast, tracks are provided in both land and groove portions in the land/groove type recording medium. Consequently, the recording density of the land-groove type recording medium is double that used in typical recording media, provided that the same linear recording density and the track pitch used. For this reason, the land-groove recording is an extremely important technique from the point of view of developing a high-density recording medium.

In the magneto-optical recording medium art, there are reports that the above-described MSR approach is not only capable of improving the linear recording density but is also capable of reducing crosstalk between the tracks. Accordingly, studies are being made to apply th MSR to land and groove recording. However, the conditions for realizing the MSR are extremely complicated, the stability is still an unknown factor, and the cost is high. For example, the conditions for realizing the MSR include the dependency of the reproducing laser power to the linear velocity, the need for a reproducing magnetic field in some cases, and the use of a recording medium having at least three magnetic layers in some cases.

In a land type recording medium, information is only recorded on land portions, and a groove (on which no information is recorded) separates adjacent lands. Importantly, the lands reduce the generation of crosstalk in which the information recorded on two adjacent lands mix during the reproduction of information.

Similarly, in a groove type recording medium, information is only recorded on the groove portions, and a land (on which no information is recorded) separates two adjacent grooves. In this type of medium, the lands suppress the generation of crosstalk in which the information recorded on two adjacent grooves mix during the reproduction of information.

In contrast, in a land-groove type recording medium, information is recorded on both land and groove portions. Consequently, the information recording regions are adjacent to each other, and the generation of crosstalk from the adjacent recording region is unavoidable. As a result, the crosstalk from the adjacent recording region greatly effects the information reproducing characteristic.

For example, a Japanese Laid-Open Patent Application No. 8-7357 proposes a method of reducing the crosstalk by appropriately selecting the depth of the groove. According to this proposed method, the wavelength of the light beam is 680 nm, the numeric aperture (NA) of the objective lens used is 0.55, and the width of the land and the groove are 0.7 $\mu$m, for example. Notably, the crosstalk can be reduced by selecting the depth of the groove to be approximately ⅙ of the wavelength.

However, the above-described method is unable to sufficiently reduce crosstalk, if the track pitch is reduced while maintaining constant the size of the beam spot of the light beam. Moreover, as described above, reducing the size of the beam spot would require an uneconomically more expensive laser. In addition, when the depth of the groove is approximately ⅙ the wavelength, the carrier level of the signal decreases to an undesirable level, and the level of a push-pull signal which is used as a tracking error signal similarly decreases. Further, it has been reported that the above-described method's ability to reduce crosstalk is significantly affected by changes in Kerr ellipticity, focal point error of the objective lens, spherical aberration and the like.

Japanese Laid-Open Patent Application No. 9-128825 proposes a method of reducing the crosstalk by setting the width of the land to be approximately equal to the width of the groove which has an optical depth of approximately ⅛ the wavelength. However, this latter proposed method requires that two read channels be provided. Namely, one read channel for reproducing the signal from the land and another read channel for reproducing the signal from the groove. Moreover, a plurality of wave plates and beam splitting prisms or the like must also be provided. As a result, a device incorporating this method becomes complex and the optical information storage unit becomes prohibitively expensive.

Furthermore, when recording information on a land or a groove of the magneto-optical recording medium, the reflected light component from an adjacent groove or land increases as the track pitch becomes smaller, thereby introducing a phase error and a change in the polarization state. Consequently, there was a problem in that the information cannot be reproduced from the magneto-optical recording medium in a satisfactory manner.

On the other hand, a Japanese Laid-Open Patent Application No. 9-161347 proposes carrying out a different phase compensation with respect to the polarization component with respect to the signal reproduced from the land and the signal reproduced from the groove. However, this reference fails to disclose how to accomplish switching of the phase compensation quantity with respect to the polarization component with respect to the signals reproduced from land portions versus signals reproduced from groove portions. For this reason, there exists a demand to realize a technique for automatically adjusting the phase compensation quantity in a simple manner, at a high speed, and with a high accuracy.

Therefore, it is an object of the present invention to provide a storage unit which can automatically and accurately adjust an optical phase compensation quantity at a high speed in a relatively simple manner, so that a crosstalk from an adjacent track of a recording medium is reduced and information can satisfactorily be reproduced from the recording medium.

SUMMARY OF THE INVENTION

The above-described object can be realized by a storage unit which uses a light beam to record information on and/or reproduce information from a recording medium having tracks formed in both land and groove regions thereof. The storage unit includes a reproducing mechanism (optical pickup) for reproducing information from the recording medium, and am optical phase adjuster for adjusting a phase of a polarization component of the light beam reflected from the recording medium in accordance with the land/groove type of the track being accessed. According to the present invention, it is possible to automatically and accurately adjust the optical phase adjusting quantity at a high speed in a relatively simple manner.

According to one aspect of the invention, distinct optical phase adjusting quantities are used to adjust the phase of the polarization component of the light beam for accessing information from a land and a groove, and the distinct optical phase adjusting quantities are stored in a control region of the disk medium. Moreover, the control region stores information identifying a track type (land or groove) for each address. The optical phase adjusting quantities and the track type information are accessed when the disk medium is initially loaded in the storage unit. In operation, the storage unit determines the appropriate phase adjusting quantity in accordance with the track type information of a target address.

Alternatively, the above-described optical phase adjusting quantities and/or the track type information may be stored in a memory in the optical storage unit. In this event, the storage unit determines the disk type when the disk medium is initially loaded, and selects the appropriate phase adjusting quantity in relation to whether the accessed address is a land or a grove.

The optical phase adjuster may include a wave plate, and a mechanism which adjusts an inclination angle of the wave plate with respect to the light beam obtained via the recording medium, based on the optical phase adjusting quantity.

Alternatively, the optical phase adjuster may include an electro-optic element, and a circuit which controls a signal that drives the electro-optic element based on the optical phase adjusting quantity. According to the present invention, it is possible to accurately adjust the optical phase adjusting quantity by use of an optical system having a relatively simple construction.

Therefore, according to the present invention, it is possible to automatically and accurately adjust the optical phase adjusting quantity at a high speed in a relatively simple manner, and the crosstalk from the adjacent track of the recording medium can be reduced.

BRIEF DESCRIPTION OF THE DRAWINGS

FIG. 2b is a sectional view of the magneto-optical disk of FIG. 2a;

FIG. 7 is a diagram for explaining the operating principle of a ½ wave plate of the storage unit of the present invention;

FIG. 8 is a perspective view showing the ½ wave plate of FIG. 7;

FIG. 9(a) shows the ½ wave plate in a land position;

FIG. 9(b) shows the ½ wave plate in a groove position;

DETAILED DESCRIPTION OF THE PREFERRED EMBODIMENTS

Figure 1:
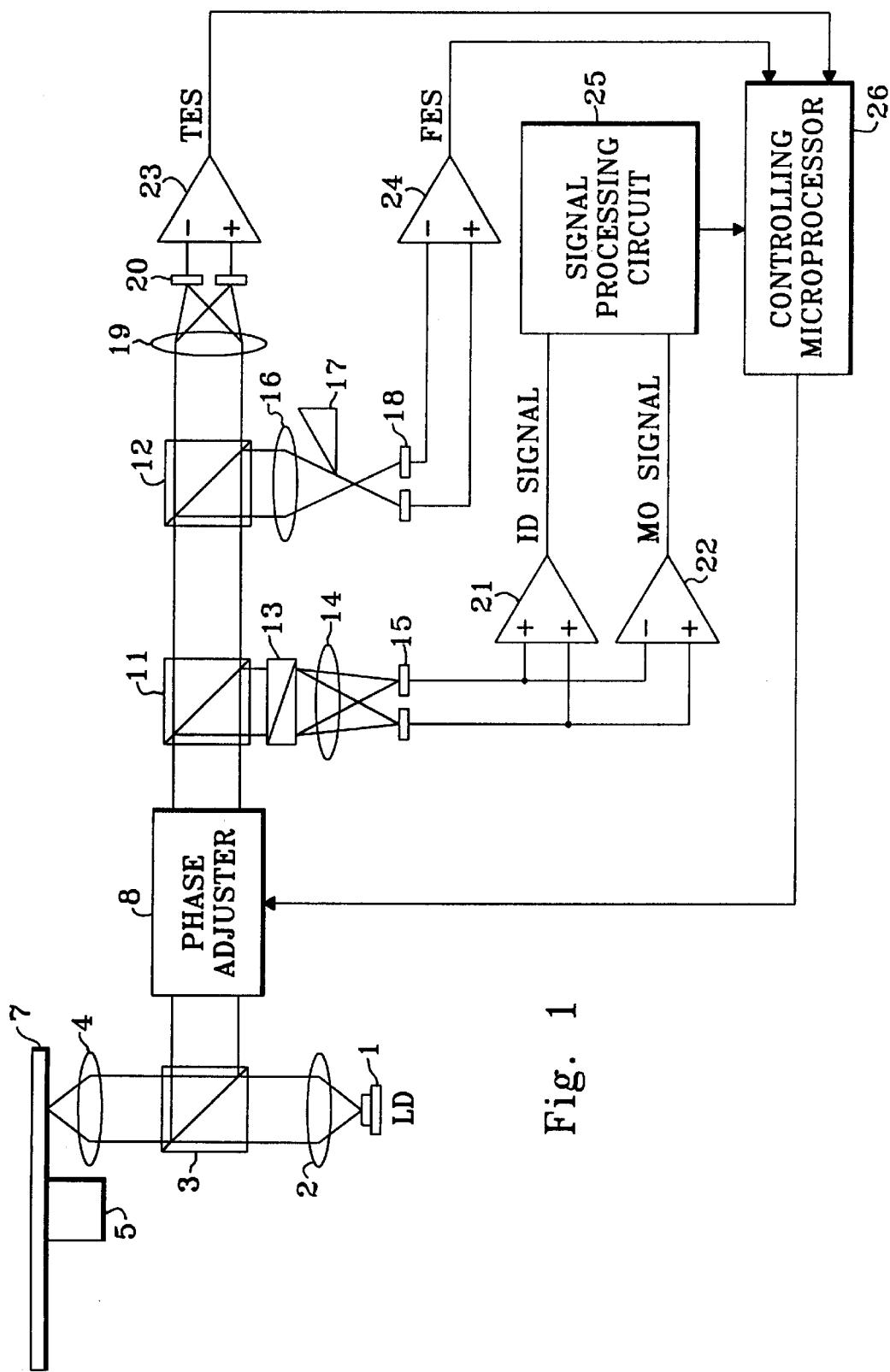
FIG. 1 is a diagram showing the general construction of a storage unit according to the present invention.

FIG. 1 is a diagram showing the general construction of a storage unit according to the present invention. In the embodiment shown, the present invention is applied to a magneto-optical disk unit.

The magneto-optical disk unit shown in FIG. 1 includes a laser diode 1, a collimator lens 2, a beam splitter 3, an objective lens 4, a motor 5, a phase adjuster 8, beam splitters 11 and 12, a Wollaston prism 13, a condenser lens 14, a photoelectric conversion element 15, a condenser lens 16, a knife edge 17, a photoelectric conversion element 18, a condenser lens 19, a photoelectric conversion element 20, an identification (ID) signal generating circuit 21, a magneto-optical (MO) signal generating circuit 22, a tracking error signal (TES) generating circuit 23, a focus error signal (FES) generating circuit 24, a signal processing circuit 25, and a controlling microprocessor 26. In a preferred embodiment, the photoelectric conversion elements 15, 18 and 20 are each made up of a 2-part photodetector.

In operation, the laser diode 1 emits a laser beam having a wavelength of, for example, 655 nm, and the laser beam is formed into a parallel light beam by the collimator lens 2. The light beam from the collimator lens 2 is transmitted through the beam splitter 3, and is converged on a magneto-optical disk 7 via the objective lens 4. The magneto-optical disk 7 is rotated by a well-known conventional motor 5.

The laser beam is reflected by the surface of the magneto-optical disk 7 to the beam splitter 3, and reaches the beam splitter 11 via the phase adjuster 8 which adjusts the optical phase. The beam splitter 11 reflects a first beam which is used to detect the ID signal and the MO signal, and transmits a second beam which is used to detect the TES and the FES.

The beam reflected by the beam splitter 11 (first beam) is converged on the photoelectric conversion element 15 via the Wollaston prism 13 and the condenser lens 14. An output signal of the photoelectric conversion element 15 is supplied to the ID signal generating circuit 21 which generates the ID signal including address information. In addition, the output signal of the photoelectric conversion element 15 is supplied to the MO signal generating circuit 22 which generates the MO signal. The signal processing circuit 25 carries out a predetermined signal processing with respect to the ID signal and the MO signal before supplying the signals to the controlling microprocessor 26.

The beam transmitted through the beam splitter 11 (second beam) reaches the beam splitter 12. The beam splitter 12 reflects one beam which is used to generate the FES, and transmits another beam which is used to generate the TES. The beam reflected by the beam splitter 12 is converged on the photoelectric conversion element 18 via the condenser lens 16 and the knife edge 17. An output signal of the photoelectric conversion element 18 is supplied to the FES generating circuit 24 which generates the FES.

The beam transmitted through the beam splitter 12 is converged on the photoelectric conversion element 20 via the condenser lens 19. An output signal of the photoelectric conversion element 20 is supplied to the TES generating circuit 23 which generates the TES. The FES and the TES are supplied to the controlling microprocessor 26.

In the above-described embodiment, the controlling microprocessor 26 carries out a focus control according to the knife edge method based on the FES, and carries out a tracking control according to the push-pull method based on the TES. However, known controls may be employed for the focus control itself and the tracking control itself. The focus control itself and the tracking control itself are not directly related to the subject matter of the present invention, and for this reason, a detailed description on the focus; control and the tracking control will be omitted in this specification.

As will be described later, the controlling microprocessor 26 judges whether the track on the magneto-optical disk 7 currently being accessed is a land or a groove based on the signals obtained from the signal processing circuit 25. Importantly, the controlling microprocessor 26 automatically adjusts the optical phase adjusting quantity of the phase adjuster 8 depending on whether the track being reproduced is the land or the groove.

Figure 2A:
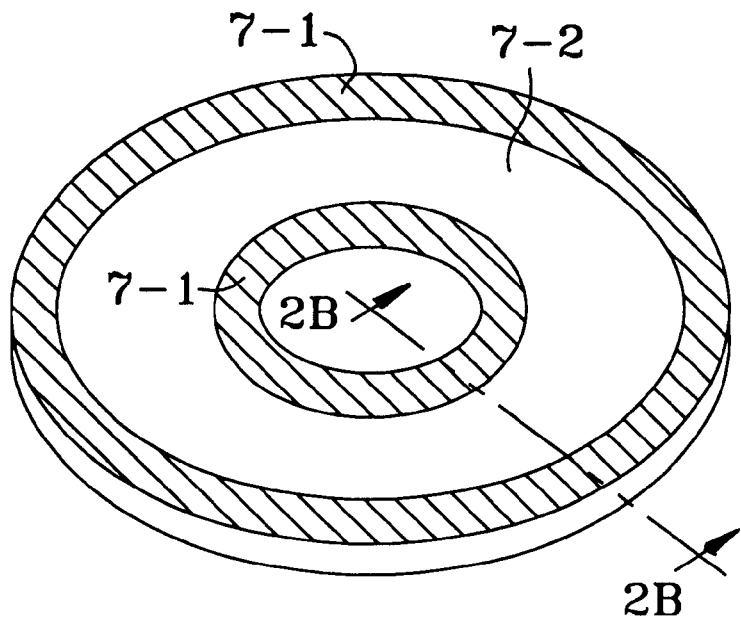
FIG. 2a is a perspective view of a magneto-optical disk used in conjunction with the storage unit of the present invention.
Figure 2B:
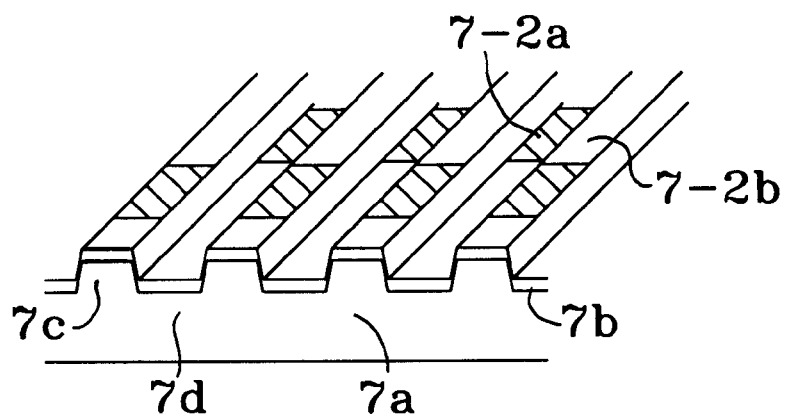

FIGS. 2(*a*) and 2(*b*) are diagrams useful in explaining a magneto-optical disk 7 used in a device according to the present invention. Notably, FIG. 2(*a*) is a perspective view of the magneto-optical disk 7, and FIG. 2(*b*) is a cross section of the structure of a data region along a line 2B—2B in FIG. 2(*a*).

As shown in FIG. 2(*a*), the magneto-optical disk 7 includes a control region 7-1 in which information related to the magneto-optical disk 7 is recorded, and a data region 7-2 in which information such as data limited to a specific purpose is recorded.

As shown in FIG. 2(*b*), the magneto-optical disk 7 is made up of a substrate 7*a* and a recording layer 7*b*. A land 7*c* and a groove 7*d* are formed on the surface of the recording layer 7*b*, concentrically or in a spiral manner. According to a preferred embodiment, the depth of the groove 7*d*, that is, a distance from a bottom surface of the groove 7*d* to a top surface of the land 7*c*, is set to ⅛ of the wavelength of the laser beam emitted from the laser diode 1.

Tracks are formed on both the land 7*c* and the groove 7*d*, and each track is divided into a plurality of sectors in order to enable a high-speed access. Each sector is made up of a sector address part 7-2*a* and a data part 7-2*b* in which information (user data) may be recorded.

The magneto-optical disk 7 is recorded with a track address for identifying each track, and a sector address for identifying each sector. The track address and the sector address may be formed as embossed pits or as magneto-optical information. The track/sector address may, for example, be determined such that the address on the land 7*c* is an odd address and the address on the groove 7*d* is an even address. In this manner, judgement of whether a target address is on the land 7*c* or on the groove 7*d* is easily accomplished. However, it is equally convenient to set the track/sector address such that the address on the land 7*c* is an even address and the address on the groove 7*d* is an odd address.

Information identifying the media type (land, groove, or land-groove type recording media) is recorded in the control region 7-1 of the magneto-optical disk 7. The recorded information further designates an optimum optical phase adjusting quantity for reproducing information from the land 7*c* and an optimum optical phase adjusting quantity for reproducing information from the groove 7*d*. Moreover, information recorded in the control region 7-1 identifies the relationship of the track/sector address and the land/groove type.

The optical phase adjusting quantity may be recorded as numeric information, a pulse signal, or a modulated pulse signal, and is used to drive a stepping motor for driving a wave plate which will be described later.

In a case where the relationship between track/sector address and land/groove type and the optical phase adjusting quantity corresponding to land and groove portions are stored in a memory (inside or outside the controlling microprocessor 26), it is possible to record only the media type of the magneto-optical disk 7 in the control region 7-1.

Figure 3:
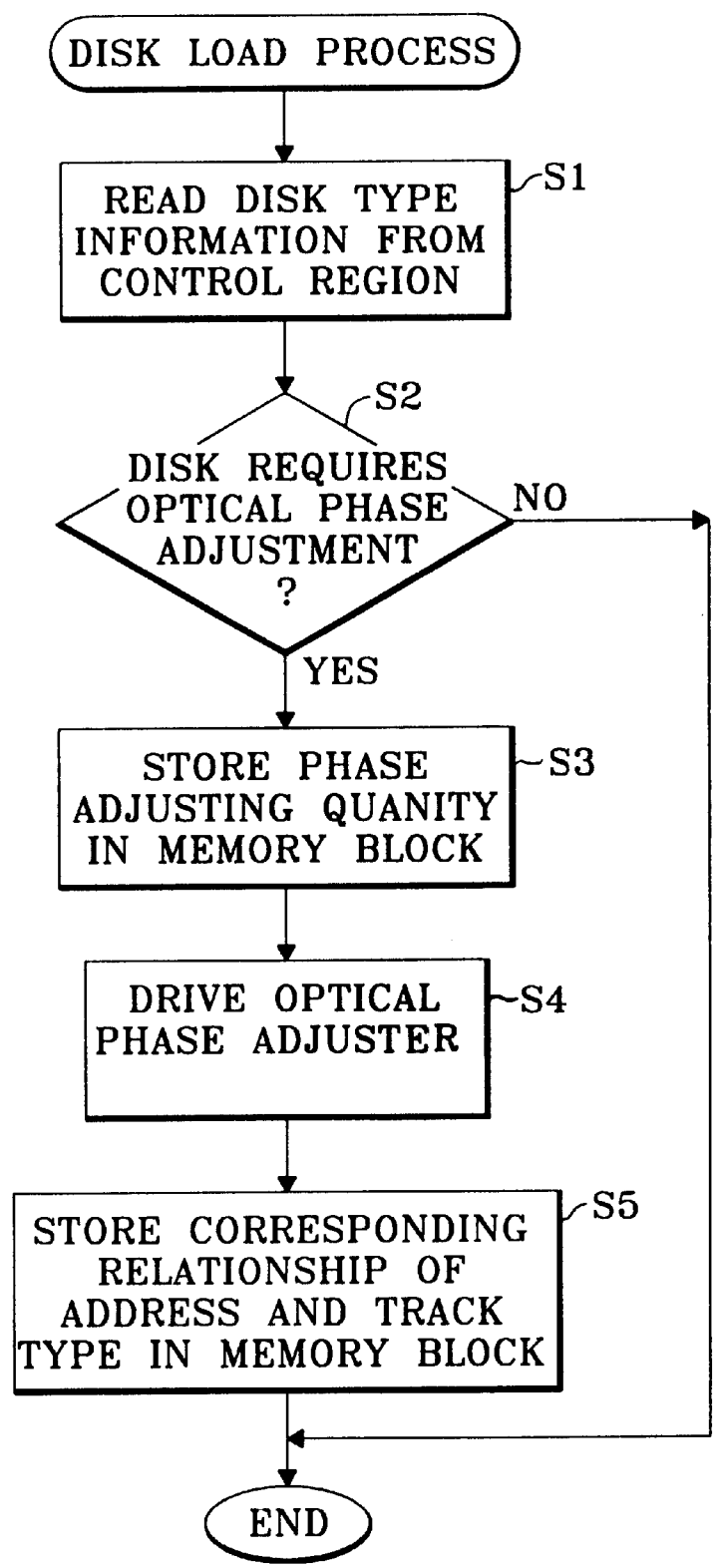
FIG. 3 is a flow chart of the process executed upon initial loading of a recording medium into a storage unit of the present invention.

Next, a description will be given of the operation of this embodiment when loading the recording medium, by referring to FIG. 3. FIG. 3 is a flow chart for explaining the process executed by the controlling microprocessor 26 upon initial loading of a recording medium into the storage unit.

The load process of FIG. 3 is executed each time a magneto-optical disk 7 is loaded into the magneto-optical disk unit. In a step S1, based on a signal from the signal processing circuit 25, the disk unit reads from the control region 7-1 of the magneto-optical disk 7 disk specific information which includes the land/groove type of the magneto-optical disk 7.

A step S2 determines whether or not the optical phase adjustment is necessary based on the information recorded in the control region 7-1 of the magneto-optical disk 7. If the decision result in step S2 is YES, then a step S3 stores the optical phase adjusting quantity in memory. In contrast, the process ends if the decision result in the step S2 is NO. Thus, in this embodiment, the phase adjusting element only adjusts the phase of polarization when the land/groove type of recording media inserted therein is such that information is recorded on both lands and grooves thereof.

A step S4 drives the optical phase adjuster 8, which will be described later, based on the optical phase adjusting quantity. In addition, a step S5 stores a corresponding relationship of the address and the land/groove type in the memory and the process ends. The steps S4 and S5 may be carried out in parallel.

Accordingly, after the load process is carried out, the corresponding relationship of the address and the land/ groove type is stored in memory. In this manner, it is possible to judge the land/groove type of the track from the address which is read from the magneto-optical disk 7, and the optical phase adjuster 8 can be driven based on a result of this judgement.

Importantly, the land/groove type is judged from the address red from the magneto-optical disk 7 using the information stored in the memory, and the optical phase adjuster 8 is driven based on the result of this judgment.

Moreover, by storing the corresponding relationship of the address and the land/groove type of tie track in the memory before the load process is carried out, or by prestoring the corresponding relationship of the address and the land/groove type of the track in the memory, it becomes possible to reduce the amount of information read from the disk 7 (i.e., reduce initializing access time). Notably, the memory can be a high-speed memory device such as a semiconductor memory device which can access stored data faster it could be accessed by the optical pickup.

Figure 4:
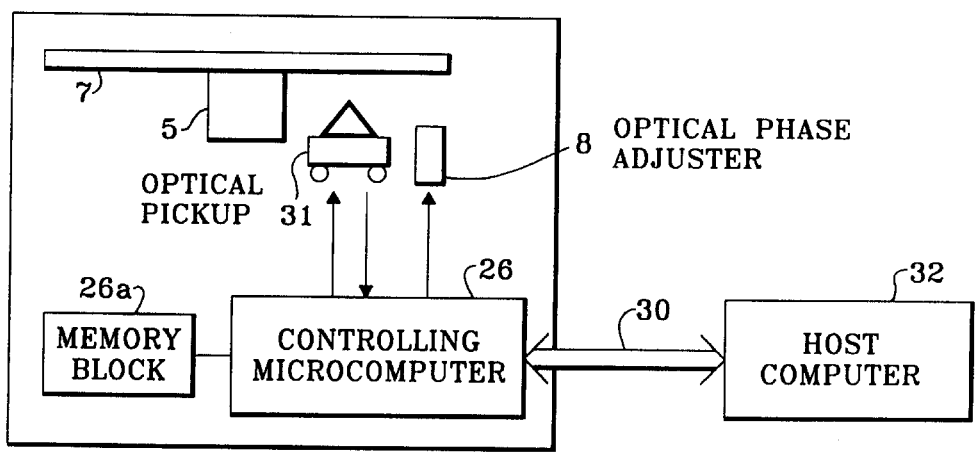
FIG. 4 is a schematic diagram of a controlling microprocessor and an optical phase adjuster according to the present invention.

FIG. 4 is a diagram for explaining the connection of the controlling microprocessor 26 and the optical phase adjuster 8. In FIG. 4, those parts which are the same as those corresponding parts in FIG. 1 are designated by the same reference numerals, and a description thereof will be omitted.

In FIG. 4, the controlling microprocessor 26 is connected to and exchanges information with the host computer 32 via a bus 30. For example, when an information transfer request is received from the host computer 32, the controlling microprocessor 26 controls an optical pickup 31 and the optical phase adjuster 8 based on the information transfer request. The optical pickup 31 has a known construction for moving the objective lens 4 shown in FIG. 1.

Although the optical phase adjuster 8 is illustrated as an element independent of the optical pickup 31 in FIG. 4, one of ordinary skill in the art will appreciate that the same results may be achieved by providing an optical phase adjuster 8 on the optical pickup 31. In addition, a memory 26a is illustrated externally to the controlling microprocessor 26 in FIG. 4, however, the memory 26a may be provided within the controlling microprocessor 26.

Figure 5:
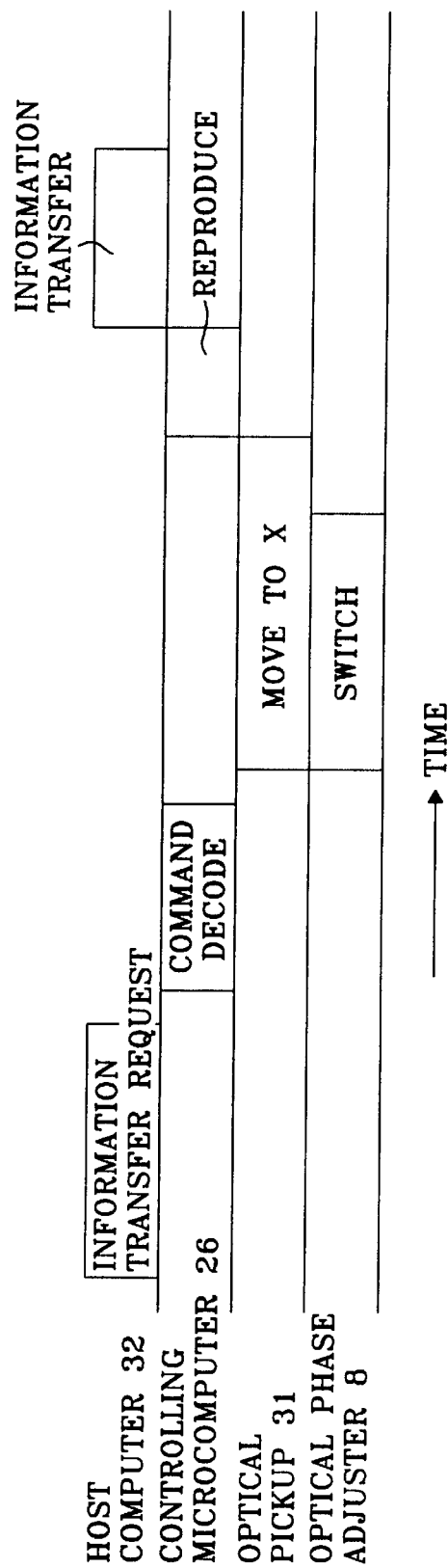
FIG. 5 is a timing diagram explaining operation of the storage unit of the present invention when reproducing information.

FIG. 5 is a timing diagram explaining operation of the storage unit of the present invention when reproducing information.

As shown in FIG. 5, when the information transfer request is issued from the host computer 32, the controlling microprocessor 26 decodes a command of the information transfer request and judges which one of the sectors of the magneto-optical disk 7 from which the information is to be transferred. If the information is not recorded in a target sector, the controlling microprocessor 26 returns error information to the host computer 32. In addition, the controlling microprocessor 26 controls the optical pickup 31 so that the laser beam is advanced to the target sector, and controls the optical phase adjusting quantity of the optical phase adjuster 8 depending on whether the target sector is the land 7c or the groove 7d. Thereafter, the controlling microprocessor 26 receives the information read from the target sector via the signal processing circuit 25, and the read information is transferred to the host computer 32 via the controlling microprocessor 26.

Figure 6:
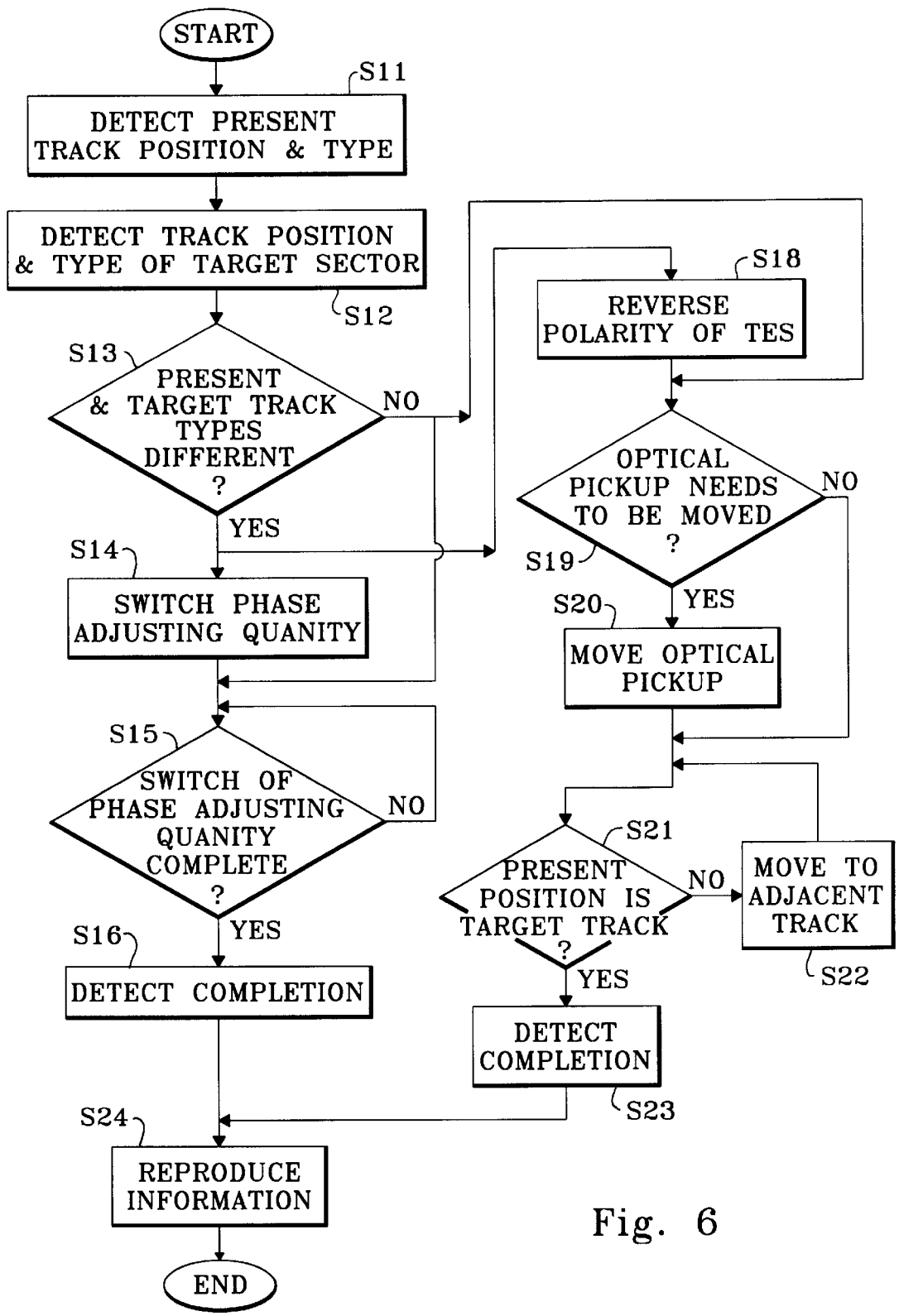
FIG. 6 is a flow chart explaining the information reproducing process for the storage unit of the present invention.

FIG. 6 is a flow chart explaining operation of the storage unit of the present invention when reproducing information. The process shown in FIG. 6 corresponds to the process after the decoding of the command up to the reproduction of the information in the time chart shown in FIG. 5, is carried out by the controlling microprocessor 26.

In FIG. 6, a step S11 detects a present track position and the land/groove type at this present track position based on a signal from the signal processing circuit 25, and stores the detected track position and land/groove type in the memory 26a, for example.

A step S12 detects a target track position and the land/ groove type at this target track position based on the information transfer request from the host computer 32 and the corresponding relationship of the address and the land/ groove type (which was stored in memory 26a in the step S5), and stores the detected target track position and land/ groove type in the memory 26a, for example.

A step S13 decides whether or not the land/groove type differs between the present track position and the target track position, based on the land/groove types stored in the memory 26a. Moreover, the optical phase adjuster 8 and the optical pickup 31 may operate in parallel depending on a decision result of the step S13.

If the decision result in the step S13 is YES, a step S14 carries out a control so as to switch the optical phase adjusting quantity of the optical phase adjuster 8 to suit the land/groove type of the present track position, based on the corresponding relationship of the address and land/groove type stored in the memory 26a.

In addition, a step S15 decides whether or not the switching of the optical phase adjusting quantity of the optical phase adjuster 8 is completed. If the decision result in the step S15 is YES, a step S16 detects the completion of the switching of the optical phase adjusting quantity of the optical phase adjuster 8, and the process advances to a step S24 which will be described later. The completion of the switching of the optical phase adjusting quantity of the optical phase adjuster 8 may be detected in response to a completion signal from the optical phase adjuster 8, or detected by an internal timer of the controlling microprocessor 26, for example, when a predetermined time elapses after the switching of the optical phase adjusting quantity.

In addition, if the decision result in the step S13 is YES, a step S18 is carried out in parallel with the step S14. The step S18 reverses the polarity of the TES from the TES generating circuit 23 if necessary, so that it is possible to move to a track of a type different from the land/groove type of the present track, and the process advances to a step S19.

On the other hand, if the decision result in the step S13 is NO, steps S15 and S19 are carried out in parallel. The step S19 decides whether or not it is necessary to move the optical pickup 31, based on a difference between the present track position and the target track position stored in the memory 26a. In other words, the optical pickup 31 is moved if the present track position and the target track position are greatly separated from each other, and the optical pickup 31 is not moved if the present track position and the target track position are not greatly separated from each other and it is possible to cope by simply moving the objective lens 4. If the decision result in the step S19 is YES, a step S20 moves the optical pickup 31.

After the step S20 or if the decision result in the step S19 is NO, a step S21 decides whether or not the present track position is the target track position. If the decision result in the step S21 is NO, a step S22 moves the position of the laser beam to an adjacent track position on the magneto-optical disk 7 by moving the objective lens 4, for example, and the process returns to the step S21. On the other hand, if the decision result in the step S21 is YES, a step S23 detects that the moving of the laser beam to the target track position is completed, and the process advances to the step S24.

When it is detected that the switching of the optical phase adjusting quantity is completed and the moving of the laser beam to the target track position is completed, the step S24 reproduces the information from the target track position, the reproduced information is transferred to the host computer 32, and the process ends.

FIG. 7 is a diagram for explaining the operating principle of first and second embodiments of the optical phase adjuster 8. In FIG. 7, the optical phase adjuster 8 includes a ½ wave plate 41 which can be set to different inclination angles with respect to an optical axis OA of the laser beam. The ½ wave plate 41 is preferably formed of a $LiNbO_3$ crystal, for example, and it is possible to arbitrarily set the optical phase of the incoming laser beam by adjusting the inclination angle of an incident surface with respect to the optical axis OA.

The ½ wave plate 41 is arranged at a land position LP where the incident surface of the ½ wave plate 41 forms an inclination angle PL with respect to the optical axis OA when reproducing the information from the land 7c of the magneto-optical disk 7. Correspondingly, the ½ wave plate 41 is arranged at a groove position GP where the incident surface of the ½ wave plate 41 forms an inclination angle PG with respect to the optical axis OA when reproducing the information from the groove 7d of the magneto-optical disk 7.

FIG. 8 is a perspective view showing the ½ wave plate 41 of the first embodiment of the optical phase adjuster 8, and FIGS. 9(a) and 9(b) are diagrams for explaining the operation of the first embodiment of the optical phase adjuster 8. FIG. 9(a) shows the ½ wave plate 41 located at the land position LP, and FIG. 9(b) shows the ½ wave plate located at the groove position GP.

As shown in FIG. 8, the ½ wave plate 41 is fixed on a support frame 42 which is rotatable about a rotary shaft 43. As shown in FIG. 9a, the rotary shaft 43 is supported on a base 51, and a metal piece 53 is provided on a lower end of the support frame 42. The support frame is biased in a first position against a stopper 55 by a biasing mechanism such as a spring 54. FIG. 9a shows the support frame biased in the land position. In this state, no current is applied to electromagnetic coil 52.

When current I is applied from the controlling microprocessor 26 to the electromagnetic coil 52, the metal piece 53 is attracted towards the electromagnetic coil 52 against a biasing force of the spring 54, and the support frame 42 rotates clockwise as shown in FIG. 9(b) As a result, the support frame 42 is stopped at the groove position GP where the metal piece 53 makes contact with the electromagnetic coil 52. FIG. 9b shows the support frame in the groove position.

In this embodiment, the optical phase error at the land position LP of the ½ wave plate 41 is set to 30, which corresponds to a counterclockwise rotation of 15 degrees from a normal position. Similarly, the optical phase error at the groove position GP is set to −30, which corresponds to a clockwise rotation of 5 degrees from a normal position. Accordingly, the positions of the stopper 55 and the electromagnetic coil 52 on the base 51 are set so that the land position LP is rotated by +15 degrees (rotated counterclockwise) from a state where the incident surface of the ½ wave plate 41 is perpendicular to the optical axis OA, and the groove position GP is rotated by −5 degrees (rotated clockwise) from the state where the incident surface of the ½ wave plate 41 is perpendicular to the optical axis OA.

The current I which is applied to the electromagnetic coil 52 depending on whether the track being reproduced is the land 7c or the groove 7d need not be applied directly from the controlling microprocessor 26, and it is of course possible to apply the current I from a controlling drive circuit (not shown) which generates the current I based on a signal from the controlling microprocessor 26.

Figure 10:
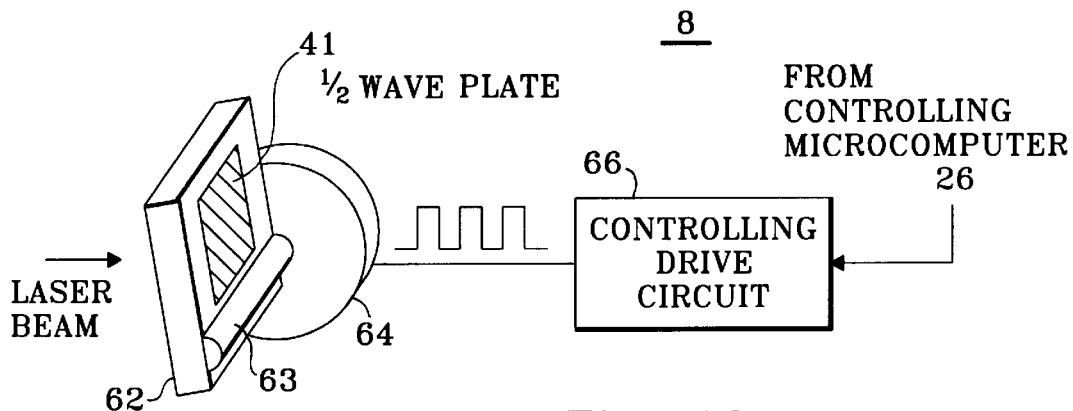
FIG. 10 is a functional diagram of a second embodiment of the optical phase adjuster.

FIG. 10 is a diagram for explaining the second embodiment of the optical phase adjuster 8. In this embodiment, the ½ wave plate 41 is fixed on a frame 62 which is mounted on a rotary shaft 63 of a stepping motor 64. A controlling drive circuit 66 generates driving pulses 1based on the signal from the controlling microprocessor 26, and supplies the driving pulses to the stepping motor 64.

According to the preferred embodiment, a stepping angle of the stepping motor 64 is 0.27 degrees, and the rotary angle of the stepping motor 64, that is, the inclination angle of the ½ wave plate 41, can be set depending on the driving pulses.

The controlling microprocessor 26 calculates the rotary angle of the stepping motor 64 based on the optical phase adjusting quantity, and supplies a signal dependent on the calculated rotary angle to the controlling drive circuit 66, so as to generate the driving pulses from the controlling drive circuit 66.

However, in a case where the driving pulses are recorded in the control region 7-1 of the magneto-optical disk 7, the controlling microprocessor 26 may supply the reproduced driving pulses to the controlling drive circuit 66, or the controlling drive circuit 66 may be omitted and the reproduced driving pulses may be supplied directly to the stepping motor 64.

According to the preferred embodiment, the stepping motor 64 is maintained in the stationary state during a time in which the driving pulses are not supplied to the stepping motor 64, making it unnecessary to provide a special position holding mechanism for holding the position of the ½ wave plate 41.

Figure 11:
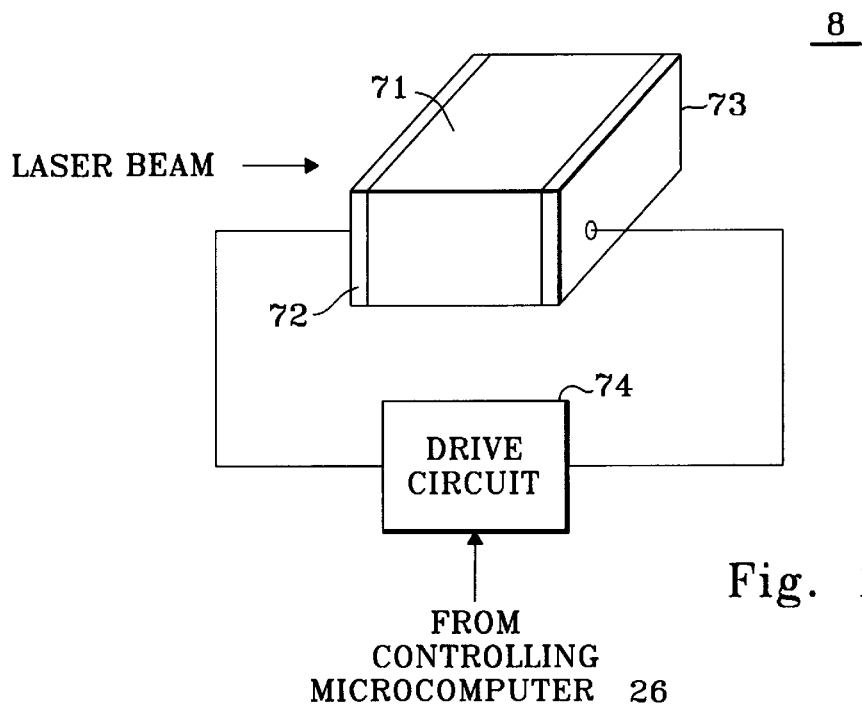
FIG. 11 is a diagram for explaining a third embodiment of the optical phase adjuster.

FIG. 11 is a diagram for explaining a third embodiment of the optical phase adjuster 8. According to this embodiment, transparent electrodes 72 and 73 are provided on both sides of an electro-optic element 71. A drive circuit 74 generates a driving voltage based on a signal from the controlling microprocessor 26, and applies the driving voltage across the transparent electrodes 72 and 73.

According to the preferred embodiment, the electrooptic element 71 is made of a KDP crystal having the Pockels effect, and the transparent electrodes 72 and 73 are provided on opposing surfaces of the electrooptic element 71. The electrooptic element 71 preferably has a flat plate-like configuration having a planar surface parallel to the optical axis OA.

The optical phase adjusting quantity of the laser beam transmitted through this electrooptic element 71 is adjusted depending on the driving voltage applied across the transparent electrodes 72 and 73.

A half-wave voltage of the KDP crystal used in this embodiment is 5 kV, and the drive circuit 74 generates a driving voltage of +0.83 kV when reproducing the information from the land 7c and generates a driving voltage of −0.83 kV when reproducing the information from the groove 7d. Of course, it is possible to omit the drive circuit 74 and apply a signal output from the controlling microprocessor 26 directly across the transparent electrodes 72 and 73.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. An optical storage unit which uses a light beam to record information on and/or reproduce information from a recording medium, the recording medium is provided with at least one land and at least one groove, and information is recorded in plural sectors in each of the at least one land and at least one groove, said optical storage unit comprising:
    an optical phase adjuster for adjusting a phase of a polarization component of the light beam returned from the recording medium based on a track type determination of a target address; and
    an optical pickup for reproducing information recorded on the recording medium using said phase-adjusted polarization component of the light beam;
    wherein said optical phase adjuster adjusts the phase of the polarization component of the light beam to a first predetermined optical phase adjusting quantity when said track type is judged to be a land, and adjusts the phase of the polarization component of the light beam to a second optical phase adjusting quantity when said track type is judged to be a groove; and
    further wherein said optical pickup reproduces information from the recording medium using said first predetermined optical phase adjusting quantity when said track type is judged to be a land and a second predetermined optical phase adjusting quantity when said track type is judged to be a groove.

2. The optical storage unit as claimed in claim 1, wherein said optical phase adjuster includes a wave plate, and a mechanism for adjusting an inclination angle of the wave plate with respect to the light beam obtained via the recording medium based on at least one of said first predetermined optical phase adjusting quantity and said second predetermined optical phase adjusting quantity.

3. The optical storage unit as claimed in claim 2, wherein said mechanism for adjusting an inclination angle of the wave plate includes:
    a support frame supporting said wave plate and which is rotatable about a rotary shaft, said support frame being biased in a fast position;
    an electromagnetic coil provided in a spaced relationship with said support frame, said electromagnetic coil rotating said support frame to a second position using a magnetic field in response to a signal from a microprocessor,
    wherein said support frame returns to said first position when said magnetic field emanating from said electromagnetic coil is terminated.

4. The optical storage unit as claimed in claim 2, wherein said mechanism for adjusting an inclination angle of the wave plate includes:
    a support frame supporting said wave plate and which is rotatable about a rotary shaft of a stepping motor, said stepping motor being driven in response to driving pulses controlled by a microprocessor.

5. The optical storage unit as claimed in claim 1, wherein said optical phase adjuster comprises:
    an electro-optic element having first and second opposing sides;
    a first transparent electrode provided on said first side of said electro-optic element;
    a second transparent electrode provided on said second side of said electro-optic element;
    said electro-optic element being positioned such that said light beam passes through said electro-optic element;
    wherein the optical phase adjusting quantity of said laser beam transmitted through said electro-optic element is adjusted depending on a driving voltage applied across said first and second electrodes.

6. The optical storage unit as claimed in claim 1, wherein said optical phase adjuster includes an electro-optic element, and a circuit which controls a signal that drives the electrooptic element based on the optical phase adjusting quantity.

7. The optical storage unit as claimed in claim 1, wherein the recording medium includes a data region and a control region, and said optical pickup reproduces said first predetermined optical phase adjusting quantity and said second optical phase adjusting quantity from the control region.

8. An optical storage unit which uses a light beam to record information on and/or reproduce information from a recording medium, the recording medium is provided with at least one land and at least one groove, and information is recorded in plural sectors in each of the at least one land and at least one groove, said optical storage unit comprising:
    an optical phase adjuster for adjusting a phase of a polarization component of the light beam returned from the recording medium based on a track type determination of a target address, wherein said optical phase adjuster adjusts the phase of the polarization component of the light beam to a first optical phase adjusting quantity when said track type is judged to be a land, and adjusts the phase of the polarization component of the light beam to a second optical phase adjusting quantity when said track tpe is judged to be a groove;
    an optical pickup for reproducing information recorded on the recording medium using said phase adjusted polarization component of the light beam, wherein said optical pickup reproduces information from the recording medium using said first optical phase adjusting quantity when said track type is judged to be a land and a second optical phase adjusting quantity when said track type is judged to be a groove; and
    memory for storing a relationship of said address and said land/groove type, and for storing said first and second optical phase adjusting quantities, wherein said optical phase adjuster adjusts the phase of the polarization component of the light beam based on said relationship stored in said memory.

9. An optical storage unit which uses a light beam to record information on and/or reproduce information from a recording medium, the recording medium is provided with at least one land and at least one groove, and information is recorded in plural sectors in each of the at least one land and at least one groove, said optical storage unit comprising:
    an optical phase adjuster for adjusting a phase of a polarization component of the light beam returned from the recording medium based on a track type determination of a target address, wherein said optical phase adjuster adjusts the phase of the polarization component of the light beam to a first optical phase adjusting quantity when said track type is judged to be a land, and adjusts the phase of the polarization component of the light beam to a second optical phase adjusting quantity when said track type is judged to be a groove; and an optical pickup for reproducing information recorded on the recording medium using said phase-adjusted polarization component of the light beam, wherein said optical pickup reproduces information from the recording medium using said first optical phrase adjusting quantity when said track type is judged to be a land and a second optical phase adjusting quantity when said track type is judged to be a groove, further wherein said optical pickup accesses information recorded in a control region of the recording medium at least upon initial loading of the recording medium in the storage unit, said reproduced information including said first and second optical phase adjusting quantities, and information specifying a relationship of said address and said land/groove type.

10. An optical storage unit which uses a light beam to record information on and/or reproduce information from a recording medium, the optical storage unit being configured and arranged to accept recording media in which information is recorded on tracks arranged on at least one of lands and grooves thereof, the optical storage unit comprising:

a reproducing element for reproducing information from the recording medium inserted therein, said information including data specifying a relationship between an address and a land/groove type from the recording medium inserted therein; and an optical phase adjusting element capable of adjusting a phase of polarization component of the light beam obtained via the recording medium based on said land/groove type associated with said address; and wherein said phase adjusting element only adjusts the phase of polarization when the land/groove type of recording media inserted therein is such that information is recorded on both lands and grooves thereof.

11. The optical storage unit as claimed in claim 10 further comprising:

a judging element for judging the land/groove type of the inserted recording medium.

12. An optical storage unit which uses a light beam to record information on and/or reproduce information from a recording medium, the optical storage unit being configured and arranged to accept recording media in which information is recorded on tracks arranged on at least one of lands and grooves thereof, the optical storage unit comprising:

a reproducing element for reproducing information from the recording medium inserted therein, said information including data specifying a relationship between an address and a land/groove type from the recording medium inserted therein; and an optical phase adjusting element capable of adjusting a phase of polarization component of the light beam obtained via the recording medium based on said land/groove type associated with said address; and wherein said phase adjusting element adjusts the phase of polarization to a first predetermined phase when reproducing information from a land, and adjusts the phase of polarization to a second predetermined phase when reproducing information from a groove, wherein said first predetermined phase is different from said second predetermined phase.

13. The optical storage unit as claimed in claim 12 further comprising:

a judging element for judging the land/groove type of the inserted recording medium.

* * * * *

UNITED STATES PATENT AND TRADEMARK OFFICE
CERTIFICATE OF CORRECTION

PATENT NO. : 6,392,972 B1
DATED : May 21, 2002
INVENTOR(S) : Yamashita et al.

It is certified that error appears in the above-identified patent and that said Letters Patent is hereby corrected as shown below:

Column 11,
Line 34, after the phrase "to a second" insert -- predetermined --.

Column 12,
Line 43, delete "tpe" insert -- type --.

Signed and Sealed this

Twenty-ninth Day of July, 2003

JAMES E. ROGAN
*Director of the United States Patent and Trademark Office*